(12) United States Patent
Wong

(10) Patent No.: US 11,002,821 B2
(45) Date of Patent: May 11, 2021

(54) MEASUREMENT METHOD FOR MEASURING MILLIMETER WAVE SIGNAL AND MEASUREMENT DEVICE USING THE SAME

(71) Applicant: Chiun Mai Communication Systems, Inc., New Taipei (TW)

(72) Inventor: Kwo-Jyr Wong, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 95 days.

(21) Appl. No.: 16/547,834

(22) Filed: Aug. 22, 2019

(65) Prior Publication Data
US 2020/0064432 A1    Feb. 27, 2020

Related U.S. Application Data

(60) Provisional application No. 62/721,007, filed on Aug. 22, 2018.

(51) Int. Cl.
| | |
|---|---|
| H04W 16/28 | (2009.01) |
| G01S 5/00 | (2006.01) |
| G01S 5/02 | (2010.01) |
| H04W 64/00 | (2009.01) |

(52) U.S. Cl.
CPC .......... G01S 5/0027 (2013.01); G01S 5/0221 (2013.01); G01S 5/0226 (2013.01); H04W 16/28 (2013.01); H04W 64/006 (2013.01)

(58) Field of Classification Search
CPC .... G01S 5/0027; G01S 5/0226; G01S 5/0221; G01S 3/023; H04W 16/28; H04W 64/006; H04W 76/10; H04B 17/309; H04B 7/0617; H04B 17/101; H04B 17/20
See application file for complete search history.

(56) References Cited

U.S. PATENT DOCUMENTS

| | | |
|---|---|---|
| 2016/0088504 A1 | 3/2016 | Chen et al. |
| 2016/0308625 A1 | 10/2016 | Chen |
| 2018/0227898 A1 | 8/2018 | Noh et al. |
| 2019/0104549 A1* | 4/2019 | Deng ............... H04B 7/0617 |
| 2019/0123996 A1* | 4/2019 | Gomadam ........... H04L 41/12 |
| 2020/0145079 A1* | 5/2020 | Marinier ........... H04B 7/0456 |

FOREIGN PATENT DOCUMENTS

| | | |
|---|---|---|
| CN | 107453795 | 12/2017 |
| CN | 108141266 | 6/2018 |
| WO | 2013130041 | 9/2013 |

* cited by examiner

*Primary Examiner* — Chuong A Ngo
(74) *Attorney, Agent, or Firm* — ScienBiziP, P.C.

(57) ABSTRACT

A measurement method for measuring millimeter wave (mm-wave) signal and device using the method includes a first measuring device receiving a mm-wave signal by an array antenna at a first angle of arrival corresponding to a position of the first measuring device, the mm-wave signal being sent by a second measuring device at a first angle of departure. Thereby, a downlink between the first measuring device and the second measuring device can be established quickly. From a certain ascertainable location, the first measurement device sends the mm-wave signal by the array antenna at a second angle of departure, and the second measurement device receives the mm-wave signal at a second angle of arrival corresponding to the position of the first measuring device, thus, an uplink between the first measuring device and the second measuring device can be established quickly.

20 Claims, 7 Drawing Sheets

MEASUREMENT METHOD FOR MEASURING MILLIMETER WAVE SIGNAL AND MEASUREMENT DEVICE USING THE SAME

CROSS-REFERENCE TO RELATED APPLICATIONS

This application claims priority to U.S. provisional Patent Application No. 62/721,007 filed on Aug. 22, 2018, the contents of which are incorporated by reference herein.

FIELD

The subject matter herein generally relates to communication field, especially relates to a measurement method for measuring millimeter wave signal and a measurement device using the same.

BACKGROUND

In the prior art, there is no measurement method for measuring angles of arrival and departure of millimeter wave signals, nor correspondence between such angles within a range covered by a base station.

BRIEF DESCRIPTION OF THE DRAWINGS

Implementations of the present disclosure will now be described, by way of embodiments, with reference to the attached figures.

DETAILED DESCRIPTION

Figure 1:
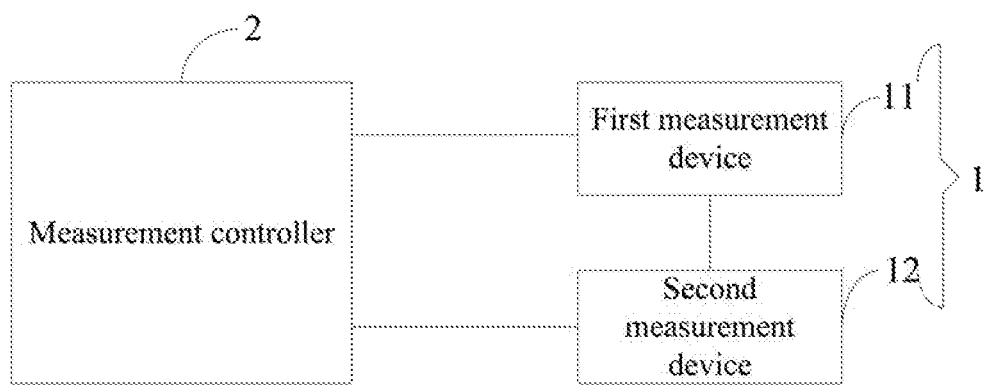
FIG. 1 is a block diagram of one embodiment of a running environment of a measurement method for measuring millimeter wave signal.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Exemplary embodiments of the present disclosure will be described in relation to the accompanying drawings.

FIG. 1 illustrates an embodiment of a running environment of a measurement method for measuring millimeter wave signal. The measurement method runs in at least two measurement devices 1 and a measurement controller 2. The at least two measurement devices 2 communicate with the measurement controller 2 by a wireless signal. The at least two measurement devices 2 communicate with each other by a millimeter wave signal. In one embodiment, the at least two measuring devices 1 have the same effective or operative structure, one of the two measuring devices 1 is defined as a first measurement device 11 and the other is second measurement device 12. In one embodiment, the first measurement device 11 can be a mobile device such as a mobile phone, and the second measurement device 12 can be a millimeter wave base station. The measurement controller 2 can be a macro base station.

Figure 2:
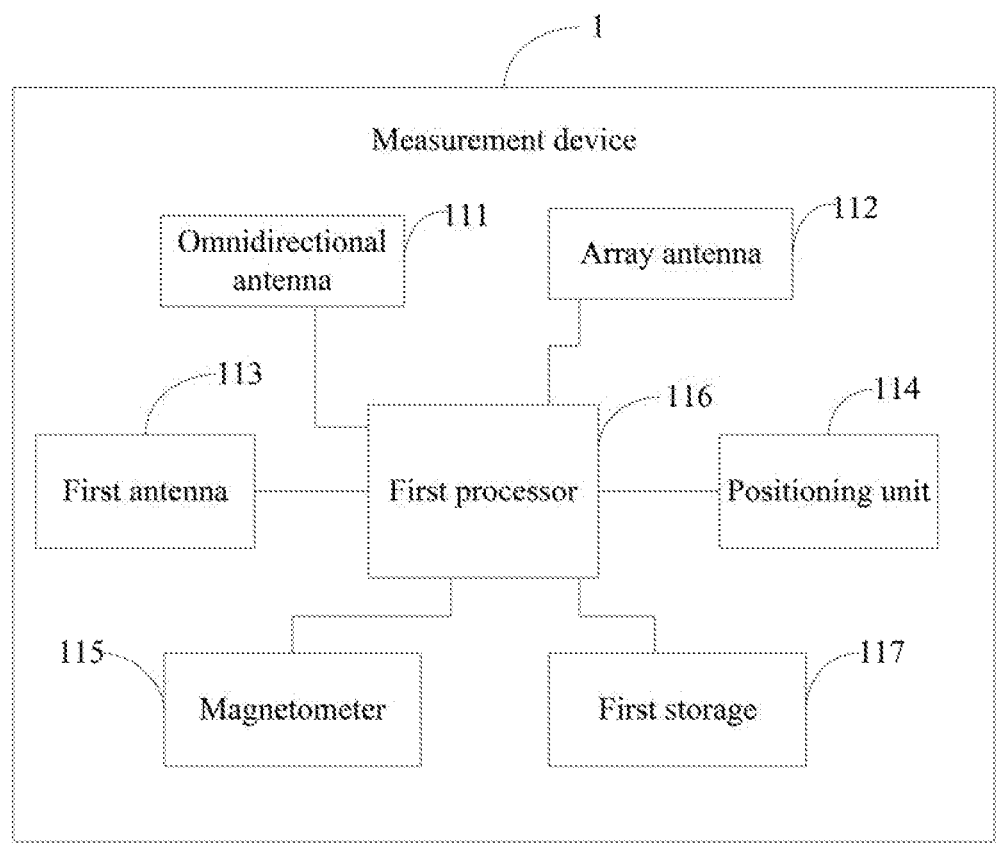
FIG. 2 is a block diagram of an embodiment of a measurement device for measuring millimeter wave signal of FIG. 1.
Figure 3:
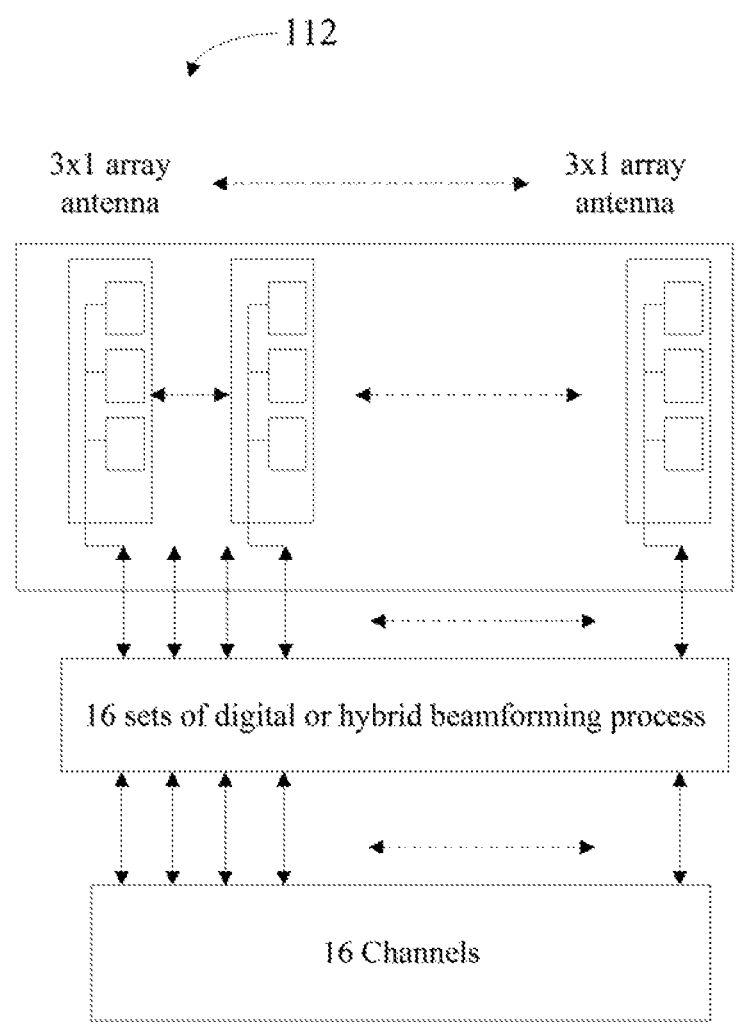
FIG. 3 is a block diagram of one embodiment of an array antenna.

FIG. 2 illustrates the measurement device 1 of FIG. 1. The measurement device 1 includes an omnidirectional antenna 111, an array antenna 112, a first antenna 113, a positioning unit 114, a magnetometer 115, a first processor 116, and a first storage 117. In one embodiment, the omnidirectional antenna 111 can be a microstrip omnidirectional antenna. FIG. 3 illustrates the array antenna 112. In one embodiment, the array antenna 112 can be a 3×1 array antenna with 16 channels. The array antenna 112 receives and sends signal by a set of channels and generates a beam of radio waves based on a set of digital or mixed beam forming process. The first antenna 113 is used to receive and transmit wireless signal, such as a control signal sent by the measurement controller 2. In one embodiment, the first antenna 113 receives low-frequency wireless signals in the 6 GHz range. The positioning unit 114 obtains position information of the measurement device 1. In one embodiment, the positioning unit 114 can be a GPS device, such as a differential GPS device. In another embodiment, the positioning unit 114 can be a Real-Time Kinematic system. The magnetometer 115 is used to measure an azimuth of the measurement device 1. In one embodiment, the magnetometer 115 measures a positive north direction of the measurement device 1 and regards the north direction as the azimuth of the measurement device 1. The azimuth of the measurement device 1 measured by the magnetometer 115 measures is not limited to the north direction, the azimuth of measurement device 1 can also be a positive south direction, a positive east direction, or a positive west direction.

In one embodiment, the first processor 116 controls the measurement device 1 to receive the millimeter wave signal by an omnidirectional antenna 111 or an array antenna 112, and to receive the wireless signal sent by the measurement controller 2 by the first antenna 113. In one embodiment, the first processor 116 is configured to execute program instructions installed in the measurement device 1 and control the measurement device 1 to execute corresponding actions. In at least one embodiment, the first processor 116 can be a central processing unit (CPU), a microprocessor, a digital signal processor, an application processor, a modem processor, or an integrated processor with an application processor and a modem processor integrated inside. In one embodiment, the first storage 117 is configured to store the data and program instructions installed in the measurement device 1. For example, the first storage 117 can be an internal storage system, such as a flash memory, a random access memory (RAM) for temporary storage of information, and/or a read-only memory (ROM) for permanent storage of information. In another embodiment, the first storage device 117 can also be an external storage system, such as a hard disk, a storage card, or a data storage medium. The first processor 116 is configured to execute program instructions installed in the measurement device 1 and control the measurement device 1 to execute corresponding actions.

Figure 4:
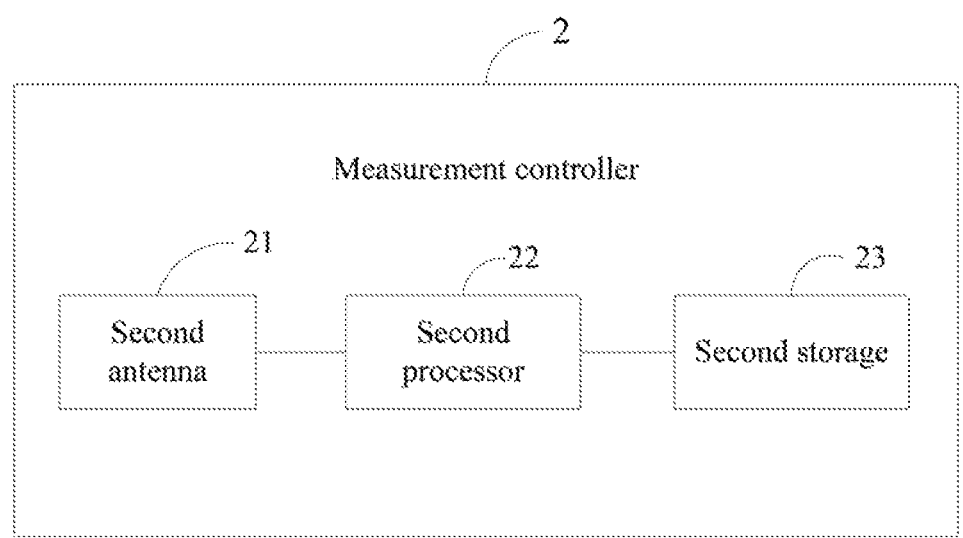
FIG. 4 is a block diagram of one embodiment of a measurement controller in the measurement device of FIG. 2.

FIG. 4 illustrates an embodiment of the measurement controller 2. In one embodiment, the measurement controller 2 includes a second antenna 21, a second processor 22, and a second storage 23. The second antenna 21 is used to receive and transmit wireless signal, for example, the measurement controller 2 can send control instructions to the measurement device 1 by the second antenna 21. In one embodiment, the first processor 116 is configured to execute program instructions installed in the measurement device 1 and control the measurement device 1 to execute corresponding actions. In at least one embodiment, the second processor 22 can be a CPU, a microprocessor, a digital signal processor, an application processor, a modem processor, or an integrated processor with an application processor and a modem processor integrated inside. In one embodiment, the second storage 23 is configured to store the data and program instructions installed in the measurement controller 2. For example, the second storage 23 can be an internal storage system, such as a flash memory, a RAM for temporary storage of information, and/or a ROM for permanent storage of information. In another embodiment, the second storage 23 can also be an external storage system, such as a hard disk, a storage card, or a data storage medium.

Figure 5:
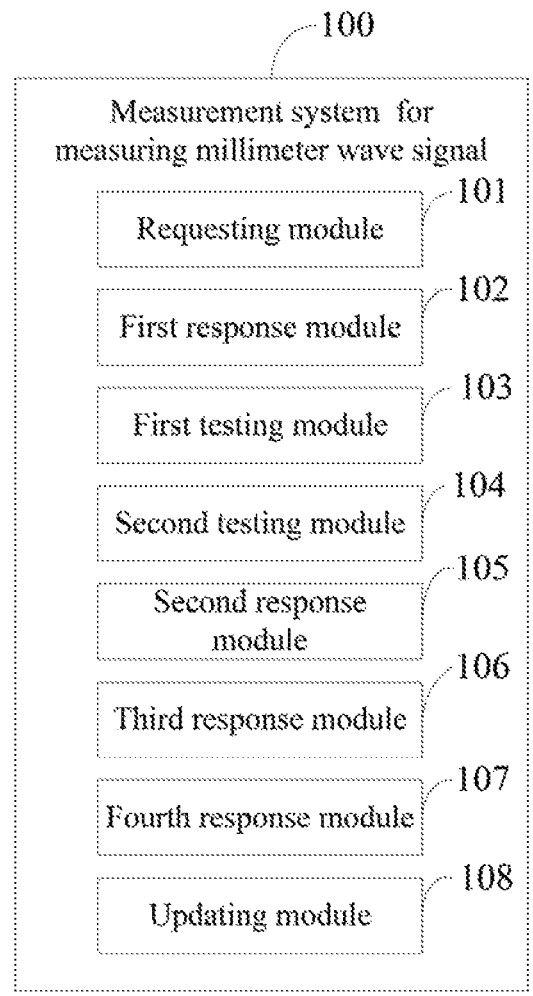
FIG. 5 illustrates a block diagram of an embodiment of a measurement system for measuring millimeter wave signal.

FIG. 5 illustrates an embodiment of a measurement system 100 for measuring millimeter wave signal. In one embodiment, the measurement system 100 includes one or more modules, the one or more modules being applied in the measurement device 1 and the measurement controller 2. In one embodiment, the measurement system 100 includes a requesting module 101, a first response module 102, a first testing module 103, a second testing module 104, a second response module 105, a third response module 106, a fourth response module 107, and an updating module 108. In one embodiment, the modules 101-108 of the measurement system 100 can be collections of software instructions. The requesting module 101, the first testing module 103, the second testing module 104, and the updating module 108 are stored in the first storage 117 and executed by the first processor 116 of the measurement device 1. The first response module 102, the second response module 105, the third response module 106, and the fourth response module 107 are stored in the second storage 23 and executed by the second processor 22 of the measurement controller 2. In on embodiment, the requesting module 101, the first testing module 103, the second testing module 104, and the updating module 108 are a program segment or code embedded in the first processor 116 of the measurement device 1. The first response module 102, the second response module 105, the third response module 106, and the fourth response module 107 are a program segment or code embedded in the second processor 22 of the measurement controller 2.

The requesting module 101 sends a testing request signal to the measurement controller 2. In one embodiment, the testing request signal contains the position information of the first measurement device 11.

In one embodiment, the requesting module 101 sends the testing request signal containing the position information of the first measurement device 11 to the measurement controller 2 by the first antenna 11 in the first measurement device 11.

The first response module 102 generates a first testing instruction and a second testing instruction according to the received testing request signal, and sends the first testing instruction to a second measurement device 12, and sends the second testing instruction to the first measurement device 11.

In one embodiment, the first response module 102 receives the testing request signal sent by the second antenna 21, generates the first and second testing instructions according to the received testing request signal. The first testing instruction is sent by the second antenna 21 to the second measurement device 12, and the second testing instruction is sent by the second antenna 21 to the first measurement device 11, and stores the position information of the first measurement device 11.

The first testing module 103 receives the first testing instruction sent by the measurement controller 2 and controls the omnidirectional antenna 111 of the second measurement device 12 to send a millimeter wave testing signal to the first measurement device 11.

In one embodiment, the second measurement device 12 receives the first testing instruction by the first antenna 113 and controls the omnidirectional antenna 111 to send the millimeter wave testing signal to the first measurement device 11.

The second testing module 104 receives the second testing instruction sent by the measurement controller 2 and controls the array antenna 112 of the first measurement device 11 to receive the millimeter wave signal according to the second testing instruction. A first angle of arrival (AOA) of a beam of the millimeter wave signal is determined according to a quality of the received millimeter wave signal, and sends the first AOA to the measurement controller 2.

Figure 6:
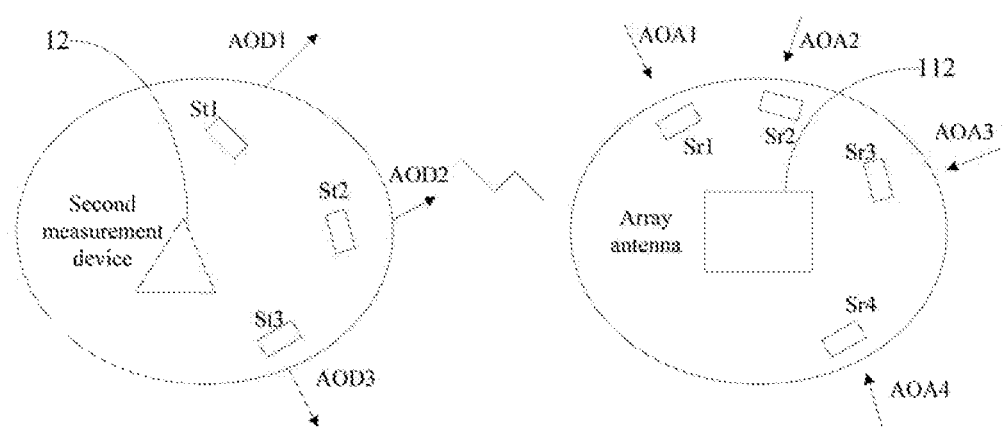
FIG. 6 illustrates a block diagram of an embodiment of a first measurement device receiving the signal sent by a second measuring device.

FIG. 6 illustrates a block diagram of an embodiment of the first measurement device 11 receiving the signal sent by the second measurement device 12. In one embodiment, the array antenna 112 has four sectors, each sector of the four sectors has at least one sector antenna. The second testing module 104 controls the sector antenna in the four sectors of the array antenna 112 to scan and receive the millimeter wave signal sent by the second measurement device 12 at different AOAs according to the second testing instruction sent by the measurement controller 2. The second testing module 104 determines an AOA of the received millimeter wave signal as a first AOA when the quality of millimeter wave signal corresponding to the AOA exceeds the signal quality threshold, and sends the first AOA to the measurement controller 2. In one embodiment, the four sectors receive the millimeter wave signal sent by the second measurement device 12 at different AOAs of the beam by the sector antenna at 0 to 90 degrees, 90 to 180 degrees, 180 to 270 degrees, and 270 to 360 degrees respectively. In one embodiment, the sector antenna has a 1×16 or 1×8 antenna structure.

In one embodiment, the array antenna 112 has three sectors, each sector of the three sectors has a sector antenna. The second testing module 104 controls the sector antenna in the three sectors of the array antenna 112 in the first measurement device 11 to scan and receive the millimeter wave signal sent by the second measurement device 12 at different AOAs according to the second testing instruction sent by the measurement controller 2. In one embodiment, the three sectors receive the millimeter wave signal sent by the second measurement device 12 at different AOAs of the beam by the sector antenna at 0 to 120 degrees, 120 to 240 degrees, and 240 to 360 degrees respectively.

The second response module 105 receives and stores the first AOA sent by the first measurement device 11, generates a third testing instruction and sends the third testing instruction to the second measurement device 12.

In one embodiment, the first testing module 103 further receives the third testing instruction by the first antenna 113 of the second measurement device 12, and controls the second measurement device 12 to send the millimeter wave signal by the array antenna 112 at different angles of departure (AOD) of the beam according to the third testing instruction. The AODs of the beam are sent to the measurement controller 2. In one embodiment, the first testing module 103 controls the sector antenna in the four sectors of the array antenna 112 in the second measurement device 12 to scan and send the millimeter wave signal to the first measurement device 11 at different AODs according to the third testing instruction sent by the measurement controller 2. In one embodiment, when the sector antennas in the four sectors of the array antenna 112 in the second measurement device 12 perform scanning, the four sectors send the millimeter wave signal at different AODs of the beam by the sector antenna at 0 to 90 degrees, 90 to 180 degrees, 180 to 270 degrees, and 270 to 360 degrees respectively.

The third response module 106 receives and stores the AOD sent by the second measurement device 12, generates a fourth testing instruction, and sends the generated fourth testing instruction to the first measurement device 11.

In one embodiment, the measurement controller 2 receives and stores the AOD sent by the second antenna 21, generates the fourth testing instruction, and sends the fourth testing instruction to the first measurement device 11.

The second testing module 104 receives the fourth testing instruction sent by the measurement controller 2 by the first antenna 113 of the first measurement device 11, and controls the array antenna 112 to receive the millimeter wave signal by the array antenna 112 at the first AOA according to the fourth testing instruction. The millimeter wave signal is sent by the array antenna 112 of the second measurement device 12.

The second testing module 104 determines whether the quality of the millimeter wave signal exceeds the signal quality threshold. If the quality of the millimeter wave signal exceeds the signal quality threshold, the second testing module 104 sends a first feedback signal to the measurement controller 2 by the first antenna 113. If the quality of the millimeter wave signal does not exceed the signal quality threshold, the second testing module 104 sends a second feedback signal to the measurement controller 2 by the first antenna 113.

In one embodiment, when receiving the first feedback signal sent by the first measurement device 11, the third response module 106 takes the AOD sent by the second measurement device 12 as a first AOD, and stores the position of the first measurement device 11, the first AOA, and the first AOD in a list. The third response module 106 receives a new AOD sent by the second measurement device 12, generates a fourth testing instruction corresponding to the new AOD, and sends the fourth testing instruction to the first measurement device 11. According to the fourth testing instruction, the first measurement device 11 is controlled to receive the millimeter wave signal at the first AOA, wherein the millimeter wave signal is sent by the array antenna 112 of the second measurement device 12 at the new AOD.

When receiving the second feedback signal sent by the first measurement device 11, the fourth response module 107 receives a new AOD sent by the second measurement device 12, and generates a fourth testing instruction corresponding to the new AOD. The fourth testing instruction is sent to the first measurement device 11 to control the first measurement device 11 to receive the millimeter wave signal at the first AOA, wherein the millimeter wave signal is sent by the array antenna 112 of the second measurement device 12 at the new AOD.

In at least one embodiment, at the position of the first measurement device 11, when the second measurement device 12 sends the millimeter wave signal at the first AOD corresponding to the position of the first measurement device 11, and the first measurement device 11 receives the millimeter wave signal at the first AOA corresponding to the position of the first measurement device 11, a downlink between the first measurement device 11 and the second measurement device 12 can be established quickly. Fast communication between the first measurement device 11 and the second measurement device 12 is thus realized.

In one embodiment, the first response module 102 generates a fifth testing instruction and a sixth testing instruction according to the received testing request signal. The fifth testing instruction is sent to the first measurement device 11, and the sixth testing instruction is sent to the second measurement device 12.

The second testing module 104 receives the fifth testing instruction sent by the measurement controller 2 and controls the omnidirectional antenna 111 of the first measurement device 11 to send the millimeter wave testing signal to the second measurement device 12. In one embodiment, the second testing module 104 sends the millimeter wave testing signal to the second measurement device 12 by the omnidirectional antenna 111 after receiving the fifth testing instruction.

In one embodiment, the first testing module 103 receives the sixth testing instruction sent by the measurement controller 2 and controls the array antenna 112 of the second measurement device 12 to receive the millimeter wave signal sent by the first measurement device 11 according to the sixth testing instruction, determines a second AOA of the beam of the millimeter wave signal according to the quality of the received millimeter wave signal, and sends the second AOA to the measuring controller 2.

In one embodiment, the array antenna 112 has four sectors, each sector of the four sectors has at least one sector antenna. The first testing module 103 controls the sector antennas in the four sectors of the array antenna 112 to scan and receive the millimeter wave signal sent by the second measurement device 12 at different AOAs according to the sixth testing instruction sent by the measurement controller 2. The first testing module 103 determines an AOA of the received millimeter wave signal as a second AOA when the quality of millimeter wave signal corresponding to the AOA exceeds the signal quality threshold, and sends the second AOA to the measurement controller 2. In one embodiment, when the sector antennas in the four sectors of the array antenna 112 are scanning, the four sectors receive the millimeter wave signal sent by the first measurement device 12 at different AOAs of the beam by the sector antenna at 0 to 90 degrees, 90 to 180 degrees, 180 to 270 degrees, and 270 to 360 degrees respectively.

In one embodiment, the second response module 105 receives and stores the second AOA sent by the second measurement device 12, generates a seventh testing instruction, and sends the seventh testing instruction to the first measurement device 11.

The second testing module 104 receives the seventh testing instruction sent by the second antenna 113 of the first measurement device 11, and sends the millimeter wave signal by the array antenna 112 at different AODs according to the seventh testing instruction, and sends AODs to the measurement controller 2. In one embodiment, the second testing module 104 controls the sector antennas in the four sectors of the array antenna 112 in the first measurement device 11 to scan and send the millimeter wave signal to the second measurement device 12 at different AODs according to the seventh testing instruction sent by the measurement controller 2. In one embodiment, when the sector antennas in the four sectors of the array antenna 112 in the first measurement device 11 are scanning, the four sectors send the millimeter wave signal at different AODs of the beam by the sector antenna at 0 to 90 degrees, 90 to 180 degrees, 180 to 270 degrees, and 270 to 360 degrees respectively.

In one embodiment, the third response module 106 receives and stores the AOD of the beam sent by the first measurement device 11, generates an eighth testing instruction, and sends the eighth testing instruction to the second measurement device 12.

The first testing module 103 receives the eighth testing instruction sent by the measurement controller 2 by the first antenna 113 of the second measurement device 12, controls the second measurement device 12 to receive the millimeter signal at the second AOA of the first measurement device 11 and by the array antenna 112 according to the eighth testing instruction.

In one embodiment, the first testing module 103 determines whether the quality of the millimeter wave signal exceeds the signal quality threshold. If the quality of the millimeter wave signal exceeds the signal quality threshold, the first testing module 103 sends the third feedback signal to the measurement controller 2 by the first antenna 113. If the quality of the millimeter wave signal does not exceed the signal quality threshold, the first testing module 103 sends a fourth feedback signal to the measurement controller 2 by the first antenna 113.

When receiving the third feedback signal sent by the second measurement device 12, the third response module 106 takes the AOD sent by the first measurement device 11 as a second AOD, and stores as a list the position of the first measurement device 11, the second AOA, and the second AOD. The third response module 106 receives a new AOD sent by the first measurement device 11, generates the eighth testing instruction corresponding to the new AOD, and sends the eighth testing instruction to the second measurement device 12 to control the second measurement device 12 to receive the millimeter wave signal at the second AOA, wherein the millimeter wave signal is sent by the array antenna 112 of the first measurement device 11 at the new AOD.

In one embodiment, when receiving the fourth feedback signal sent by the second measurement device 12, the fourth response module 107 receives a new AOD sent by the first measurement device 11, generates the eighth testing instruction corresponding to the new AOD, and sends the eighth testing instruction to the second measurement device 12 to control the second measurement device 12 to receive the millimeter wave signal at the second AOA, wherein the millimeter wave signal is sent by the first measurement device 11 by the array antenna 112 of the first measurement device 11 at the newt AOD.

In at least one embodiment, at the position of the first measurement device 11, when the first measurement device 11 sends the millimeter wave signal at the second AOD corresponding to the position of the first measurement device 11, and the second measurement device 12 receives the millimeter wave signal at the second AOA corresponding to the position of the first measurement device 11, an uplink between the first measurement device 11 and the second measurement device 12 can be established quickly, thus realizing quick communication between the first measurement device 11 and the second measurement device 12.

In one embodiment, the updating module 108 determines whether the first measurement device 11 moves to a new position, and if so, sends a new testing request signal containing the position information of the first measurement device 11 to the measurement controller 2. In one embodiment, a geographical area may be divided into several sub-regions of the same size, such as the sub-region having a size of 20 m×20 m. When determining that the first measurement device 11 moves to a new sub-region, the updating module 108 sends a new testing request signal containing the position information of the first measurement device 11 to the measurement controller 2.

Figure 7:
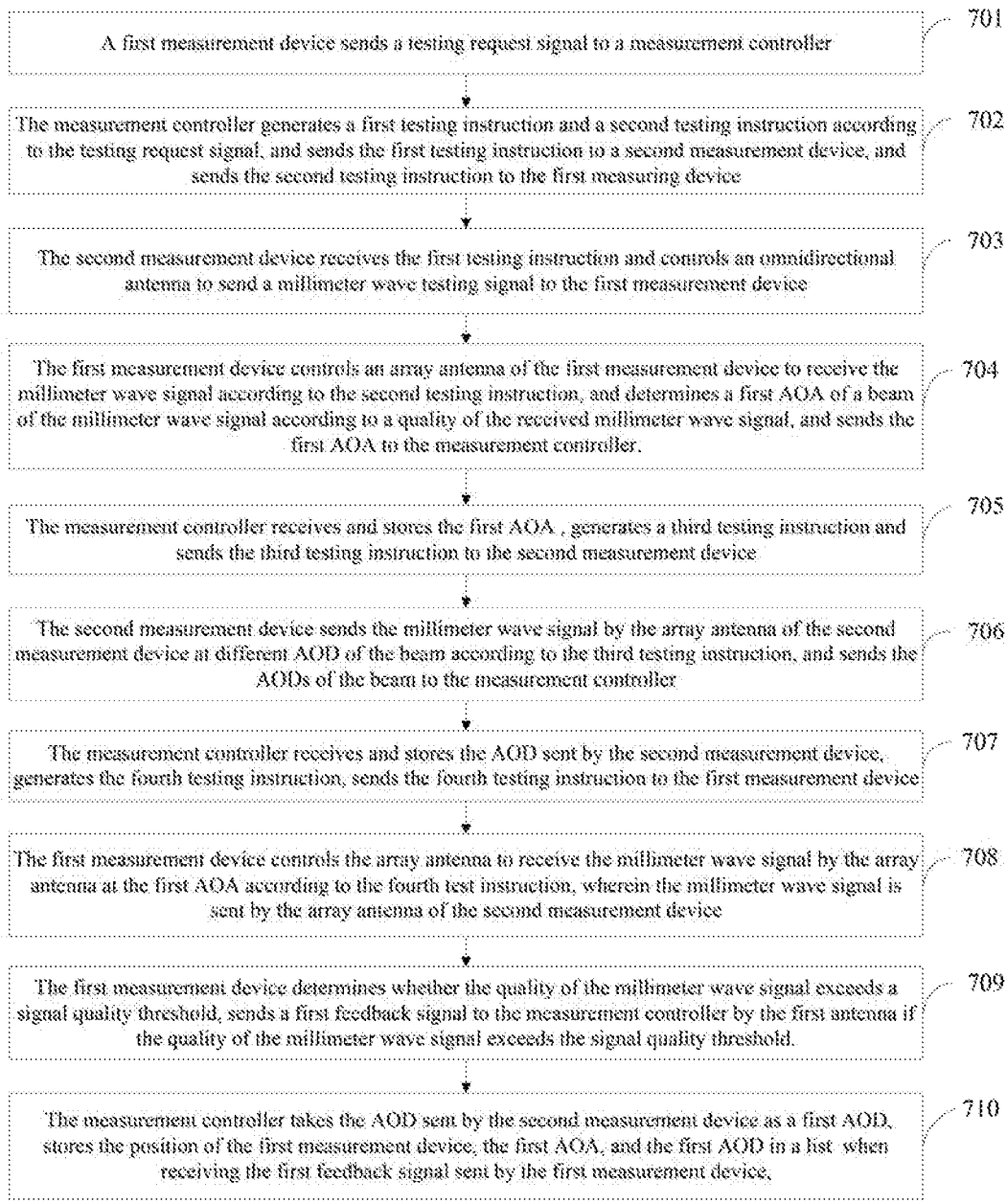
FIG. 7 illustrates a flowchart of one embodiment of a method for measuring millimeter wave signal.

FIG. 7 illustrates a flowchart of one embodiment of a measurement method for measuring millimeter wave signal. The method is provided by way of example, as there are a variety of ways to carry out the method. The method described below can be carried out using the configurations illustrated in FIGS. 1-6, for example, and various elements of these figures are referenced in explaining the example method. Each block shown in FIG. 7 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 701.

At block 701, a first measurement device sends a testing request signal to a measurement controller. In one embodiment, the testing request signal contains the position information of the first measurement device.

In one embodiment, the first measurement device sends the testing request signal containing the position information of the first measurement device to the measurement controller by first antenna in the first measurement device.

At block 702, the measurement controller generates a first testing instruction and a second testing instruction according to the testing request signal, and sends the first testing instruction to a second measurement device, and sends the second testing instruction to the first measuring device.

In one embodiment, the measurement controller receives the testing request signal sent by a second antenna of the measurement controller, generates the first testing instruction and the second testing instruction according to the received testing request signal, sends the first testing instruction by the second antenna to the second measurement device, and sends the second testing instruction by the second antenna to the first measurement device, and stores the position information of the first measurement device.

At block 703, the second measurement device receives the first testing instruction sent by the measurement controller and controls an omnidirectional antenna of the second measurement device to send a millimeter wave testing signal to the first measurement device.

In one embodiment, the second measurement device receives the first testing instruction by the first antenna of the second measurement device and controls the omnidirectional antenna to send the millimeter wave testing signal to the first measurement device.

At block 704, the first measurement device receives the second testing instruction sent by the measurement controller and controls an array antenna of the first measurement device to receive the millimeter wave signal according to the second testing instruction, and determines a first AOA of a beam of the millimeter wave signal according to a quality of the received millimeter wave signal, and sends the first AOA to the measurement controller.

In one embodiment, the array antenna has four sectors, each sector of the four sectors has at least one sector antenna. The first measurement device controls the sector antenna in the four sectors of the array antenna to scan and receive the millimeter wave signal sent by the second measurement device at different AOAs according to the second testing instruction sent by the measurement controller. The first measurement device determines an AOA of the received millimeter wave signal as a first AOA when the quality of the millimeter wave signal corresponding to the AOA exceeds the signal quality threshold, and sends the first AOA to the measurement controller. In one embodiment, the four sectors receive the millimeter wave signal sent by the second measurement device at different AOAs of the beam by the sector antenna at 0 to 90 degrees, 90 to 180 degrees, 180 to 270 degrees, and 270 to 360 degrees respectively. In one embodiment, the sector antenna has a 1×16 or 1×8 antenna structure.

In another embodiment, the array antenna has three sectors, each sector of the three sectors has a sector antenna. The first measurement device controls the sector antenna in the three sectors of the array antenna in the first measurement device to scan and receive the millimeter wave signal sent by the second measurement device at different AOAs according to the second testing instruction sent by the measurement controller. In one embodiment, the three sectors receive the millimeter wave signal sent by the second measurement device at different AOAs of the beam by the sector antenna at 0 to 120 degrees, 120 to 240 degrees, and 240 to 360 degrees respectively.

At block 705, the measurement controller receives and stores the first AOA sent by the first measurement device, generates a third testing instruction and sends the third testing instruction to the second measurement device.

At block 706, the second measurement device further receives the third testing instruction by the first antenna of the second measurement device, and sends the millimeter wave signal by the array antenna of the second measurement device at different AOD of the beam according to the third testing instruction, and sends the AODs of the beam to the measurement controller.

In one embodiment, the second measurement device controls the sector antenna in the four sectors of the array antenna to scan and sends the millimeter wave signal to the first measurement device at different AODs according to the third testing instruction sent by the measurement controller. In one embodiment, when the sector antenna in the four sectors of the array antenna in the second measurement device scans, the four sectors send the millimeter wave signal at different AODs of the beam by the sector antenna at 0 to 90 degrees, 90 to 180 degrees, 180 to 270 degrees, and 270 to 360 degrees respectively.

At block 707, the measurement controller receives and stores the AOD sent by the second measurement device, generates the fourth testing instruction, and sends the fourth testing instruction to the first measurement device.

In one embodiment, the measurement controller receives and stores the AOD sent by the second antenna, generates the fourth testing instruction, and sends the fourth testing instruction to the first measuring device.

At block 708, the first measurement device receives the fourth testing instruction sent by the measurement controller by the first antenna of the first measuring device, and controls the array antenna to receive the millimeter wave signal by the array antenna at the first AOA according to the fourth testing instruction, wherein the millimeter wave signal is sent by the array antenna of the second measurement device.

At block 709, the first measurement device determines whether the quality of the millimeter wave signal exceeds the signal quality threshold, and if the quality of the millimeter wave signal exceeds the signal quality threshold, the first measurement device sends a first feedback signal to the measurement controller by the first antenna. If the quality of the millimeter wave signal does not exceed the signal quality threshold, the first measurement device sends a second feedback signal to the measurement controller by the first antenna.

At block 710, when receiving the first feedback signal sent by the first measurement device, the measurement controller takes the AOD sent by the second measurement device as a first AOD, stores the position of the first measurement device, the first AOA, and the first AOD in a list. The measurement controller receives a new AOD sent by the second measurement device, generates a fourth testing instruction corresponding to the new AOD, and sends the fourth testing instruction to the first measurement device to control the first measurement device to receive the millimeter wave signal at the first AOA, wherein the millimeter wave signal is sent by the second measurement device by the array antenna of the second measurement device at the new AOD.

When receiving the second feedback signal sent by the first measurement device, the measurement controller receives a new AOD sent by the second measurement device, generates a fourth testing instruction corresponding to the new AOD, and sends the fourth testing instruction to the first measurement device to control the first measurement device to receive the millimeter wave signal at the first AOA, wherein the millimeter wave signal is sent by the array antenna of the second measurement device at the new AOD.

In at least one embodiment, at the position of the first measurement device, when the second measurement device sends the millimeter wave signal at the first AOD corresponding to the position of the first measurement device, and the first measurement device receives the millimeter wave signal at the first AOA corresponding to the position of the first measurement device, a downlink between the first measurement device and the second measurement device can be established quickly, thus realizing quick communication between the first measurement device and the second measurement device.

In one embodiment, the measurement controller generates the fifth testing instruction and the sixth testing instruction according to the received testing request signal, and sends the fifth testing instruction to the first measurement device, and sends the sixth testing instruction to the second measurement device.

The first measurement device receives the fifth testing instruction sent by the measurement controller and controls the omnidirectional antenna of the first measurement device to send the millimeter wave testing signal to the second measurement device. In one embodiment, the first measurement device sends the millimeter wave testing signal to the second measurement device by the omnidirectional antenna after receiving the fifth testing instruction.

In one embodiment, the second measurement device receives the sixth testing instruction sent by the measurement controller and controls the array antenna of the second measurement device to receive the millimeter wave signal sent by the first measurement device according to the sixth testing instruction, determines a second AOA of the beam of the millimeter wave signal according to the quality of the received millimeter wave signal, and sends the second AOA to the measuring controller 2.

In one embodiment, the array antenna has four sectors, each sector of the four sectors has at least one sector antenna. The second measurement device controls the sector antenna in the four sectors of the array antenna to scan and receive the millimeter wave signal sent by the second measurement device at different AOAs according to the sixth testing instruction sent by the measurement controller. The second measurement device determines an AOA of the received millimeter wave signal as a second AOA when the quality of millimeter wave signal corresponding to the AOA exceeds the signal quality threshold, and sends the second AOA to the measurement controller. In one embodiment, when the sector antenna in the four sectors of the array antenna scans, the four sectors receive the millimeter wave signal sent by the first measurement device at different AOAs of the beam by the sector antenna at 0 to 90 degrees, 90 to 180 degrees, 180 to 270 degrees, and 270 to 360 degrees respectively.

In one embodiment, the measurement controller receives and stores the second AOA sent by the second measurement device, generates the seventh testing instruction, and sends the seventh testing instruction to the first measurement device.

The first measurement device receives the seventh testing instruction by the second antenna of the first measurement device, and sends the millimeter wave signal by the array antenna at different AOD according to the seventh testing instruction, and sends AODs to the measurement controller. In one embodiment, the first measurement device controls the sector antenna in the four sectors of the array antenna in the first measurement device to scan and sends the millimeter wave signal to the second measurement device at different AODs according to the seventh testing instruction sent by the measurement controller. In one embodiment, when the sector antenna in the four sectors of the array antenna in the first measurement device scans, the four sectors send the millimeter wave signal at different AODs of the beam by the sector antenna at 0 to 90 degrees, 90 to 180 degrees, 180 to 270 degrees, and 270 to 360 degrees respectively.

In one embodiment, the measurement controller receives and stores the AOD of the beam sent by the first measurement device, generates the eighth testing instruction, and sends the eighth testing instruction to the second measurement device.

The second measurement device receives the eighth testing instruction sent by the measurement controller by the first antenna of the second measurement device, receives the millimeter signal at the second AOA of the first measurement device and by the array antenna according to the eighth testing instruction.

In one embodiment, the second measurement device determines whether the quality of the millimeter wave signal exceeds the signal quality threshold, and if the quality of the millimeter wave signal exceeds the signal quality threshold, the second measurement device sends the third feedback signal to the measurement controller by the first antenna. If the quality of the millimeter wave signal does not exceed the signal quality threshold, the second measurement device sends a fourth feedback signal to the measurement controller by the first antenna.

When receiving the third feedback signal sent by the second measurement device, the measurement controller takes the AOD sent by the first measurement device as a second AOD, stores the position of the first measurement device 11, the second AOA, and the second AOD in a list. The measurement controller receives a new AOD sent by the first measurement device, generates an eighth testing instruction corresponding to the new AOD, and sends the eighth testing instruction to the second measurement device to control the second measurement device to receive the millimeter wave signal at the second AOA, wherein the millimeter wave signal is sent by the array antenna of the first measurement device at the new AOD.

In one embodiment, when receiving the fourth feedback signal sent by the second measurement device, the measurement controller receives a new AOD sent by the first measurement device, generates an eighth testing instruction corresponding to the new AOD, and sends the eighth testing instruction to the second measurement device to control the second measurement device to receive the millimeter wave signal at the second AOA, wherein the millimeter wave signal is sent by the first measurement device by the array antenna of the first measurement device at the newt AOD.

In at least one embodiment, at the position of the first measurement device, when the first measurement device sends the millimeter wave signal at the second AOD corresponding to the position of the first measurement device, and the second measurement device receives the millimeter wave signal at the second AOA corresponding to the position of the first measurement device, an uplink between the first measurement device and the second measurement device can be established quickly, thus realizing quick communication between the first measurement device and the second measurement device.

In one embodiment, the method further includes: the first measurement device determines whether the first measurement device moves to a new position, and sends a new testing request signal containing the position information of the first measurement device to the measurement controller when the first measurement device moves to a new position.

In one embodiment, a geographical area may be divided into several sub-regions of the same size, such as the sub-region has a size of 20 m×20 m. When determining that the first measurement device moves to a new sub-region, the first measurement device sends a new testing request signal containing the position information of the first measurement device to the measurement controller.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A measurement device for measuring millimeter wave comprising:
   an omnidirectional antenna;
   an array antenna;
   a first antenna;
   a processor connected to the omnidirectional antenna, the array antenna, and the first antenna; and
   a non-transitory storage medium coupled to the processor and configured to store a plurality of instructions, which cause the measurement device to:
   send a testing request signal containing a position information of the measurement device to a measurement controller;
   receive a second testing instruction sent by the measurement controller and control the array antenna of the measurement device to receive the millimeter wave signal according to the second testing instruction, and determine a first angle of arrival (AOA) of a beam of the millimeter wave signal according to a quality of the received millimeter wave signal, and send the first AOA to the measurement controller;
   receive a fourth testing instruction sent by the measurement controller by the first antenna, and control the array antenna to receive the millimeter wave signal by the array antenna at the first AOA according to the fourth testing instruction, wherein the millimeter wave signal is sent by the array antenna of a second measurement device;
   determine whether the quality of the millimeter wave signal exceeds a signal quality threshold;
   if the quality of the millimeter wave signal exceeds the signal quality threshold, send a first feedback signal to the measurement controller by the first antenna; and
   if the quality of the millimeter wave signal does not exceed the signal quality threshold, send a second feedback signal to the measurement controller by the first antenna.

2. The measurement device according to claim 1, wherein the plurality of instructions are further configured to cause the measurement device to:
   receive a first testing instruction sent by the measurement controller and control the omnidirectional antenna of the measurement device to send a millimeter wave testing signal to the second measurement device;
   receive a third testing instruction by the first antenna of the measurement device, and control the measurement device to send the millimeter wave signal by the array antenna at different angles of departure (AOD) of the beam according to the third testing instruction, and send the AODs of the beam to the measurement controller.

3. The measurement device according to claim 1, wherein the plurality of instructions are further configured to cause the measurement device to:
   determine whether the measurement device moves to a new position; and
   send a new testing request signal containing the position information of the measurement device to the measurement controller when the measurement device moves to a new position.

4. The measurement device according to claim 1, wherein the array antenna has four sectors, each sector of the four sectors has at least one sector antenna.

5. The measurement device according to claim 4, wherein the plurality of instructions are further configured to cause the measurement device to:
   control the sector antenna in the four sectors of the array antenna to scan and receive the millimeter wave signal sent by the second measurement device at different AOAs according to the second testing instruction sent by the measurement controller.

6. The measurement device according to claim 4, wherein the plurality of instructions are further configured to cause the measurement device to:
   receive a seventh testing instruction sent by the measurement controller, and send the millimeter wave signal by the array antenna at different AODs according to the seventh testing instruction, and send AODs to the measurement controller.

7. A measurement controller comprising:
   a second antenna;
   a processor connected to the second antenna; and
   a non-transitory storage medium coupled to the processor and configured to store a plurality of instructions, which cause the measurement controller to:
   generate a first testing instruction and a second testing instruction according to the received testing request signal, send the first testing instruction to a second measurement device, and send the second testing instruction to a first measurement device;
   receive and store a first AOA sent by the first measurement device, generate a third testing instruction and send the third testing instruction to the second measurement device;
   receive and store an AOD sent by the second measurement device, generate the fourth testing instruction, and send the generated fourth testing instruction to the first measurement device;
   when receiving a first feedback signal sent by the first measurement device, take the AOD sent by the second measurement device as a first AOD, store the position of the first measurement device, the first AOA, and the first AOD in a list; and
   receive a new AOD sent by the second measurement device, generate a fourth testing instruction corresponding to the new AOD, and send the fourth testing instruction to the first measurement device to control the first measurement device to receive the millimeter wave signal at the first AOA, wherein the millimeter wave signal is sent by an array antenna of the second measurement device at the new AOD.

8. The measurement controller according to claim 7, wherein the plurality of instructions are further configured to cause the measurement controller to:
   when receiving the second feedback signal sent by the first measurement device, receive a new AOD sent by the second measurement device;

generate a fourth testing instruction corresponding to the new AOD; and send the fourth testing instruction to the first measurement device to control the first measurement device to receive the millimeter wave signal at the first AOA, wherein the millimeter wave signal is sent by the array antenna of the second measurement device at the new AOD.

9. The measurement controller according to claim 8, wherein the plurality of instructions are further configured to cause the measurement controller to:

generate a fifth testing instruction and a sixth testing instruction according to the testing request signal, and send the fifth testing instruction to the first measurement device, and send the sixth testing instruction to the second measurement device;

receive and store a second AOA sent by the second measurement device, generate a seventh testing instruction, and send the seventh testing instruction to the first measurement device;

receive and store the AOD sent by the first measurement device, generate an eighth testing instruction, and send the eighth testing instruction to the second measurement device;

when receiving a third feedback signal sent by the second measurement device, take the AOD sent by the first measurement device as a second AOD, store the position of the first measurement device, the second AOA, and the second AOD in the list; and receives a new AOD sent by the first measurement device, generate an eighth testing instruction corresponding to the new AOD, and send the eighth testing instruction to the second measurement device to control the second measurement device to receive the millimeter wave signal at the second AOA, wherein the millimeter wave signal is sent by the array antenna of the first measurement device at the new AOD.

10. The measurement controller according to claim 9, wherein the plurality of instructions are further configured to cause the measurement controller to:

when receiving a fourth feedback signal sent by the second measurement device, receive a new AOD sent by the first measurement device, generate the eighth testing instruction corresponding to the new AOD, and send the eighth testing instruction to the second measurement device to control the second measurement device to receive the millimeter wave signal at the second AOA, wherein the millimeter wave signal is sent by the first measurement device by the array antenna of the first measurement device at the newt AOD.

11. A measurement method for measuring millimeter wave comprising:

a first measurement device sending a testing request signal containing a position information of the first measurement device to a measurement controller;

the measurement controller generating a first testing instruction and a second testing instruction according to the testing request signal, and sending the first testing instruction to a second measurement device, and sending the second testing instruction to the first measuring device;

the second measurement device receiving the first testing instruction sent by the measurement controller and controlling an omnidirectional antenna of the second measurement device to send a millimeter wave testing signal to the first measurement device;

the first measurement device receiving the second testing instruction sent by the measurement controller and controlling an array antenna of the first measurement device to receive the millimeter wave signal according to the second testing instruction, and determining a first AOA of a beam of the millimeter wave signal according to a quality of the received millimeter wave signal, and sending the first AOA to the measurement controller;

the measurement controller receiving and storing the first AOA sent by the first measurement device, generating a third testing instruction and sending the third testing instruction to the second measurement device;

the second measurement device receiving the third testing instruction by the first antenna of the second measurement device, and sending the millimeter wave signal by the array antenna of the second measurement device at different AOD of the beam according to the third testing instruction, and sending the AODs of the beam to the measurement controller;

the measurement controller receiving and storing the AOD sent by the second measurement device, generating a fourth testing instruction, and sending the fourth testing instruction to the first measurement device;

the first measurement device receiving the fourth testing instruction by the first antenna of the first measuring device, and controlling the array antenna to receive the millimeter wave signal by the array antenna at the first AOA according to the fourth testing instruction, wherein the millimeter wave signal is sent by the array antenna of the second measurement device;

the first measurement device determining whether the quality of the millimeter wave signal exceeds the signal quality threshold, and sending a first feedback signal to the measurement controller by the first antenna when the quality of the millimeter wave signal exceeds the signal quality threshold; and the measurement controller taking the AOD sent by the second measurement device as a first AOD when receiving the first feedback signal sent by the first measurement device, storing the position of the first measurement device, the first AOA, and the first AOD in a list.

12. The measurement method according to claim 11 further comprising:

the measurement controller receiving a new AOD sent by the second measurement device;

generating a fourth testing instruction corresponding to the new AOD; and sending the fourth testing instruction to the first measurement device to control the first measurement device to receive the millimeter wave signal at the first AOA, wherein the millimeter wave signal is sent by the array antenna of the second measurement device at the new AOD.

13. The measurement method according to claim 12 further comprising:

the first measurement device sending a second feedback signal to the measurement controller by the first antenna when the quality of the millimeter wave signal does not exceed the signal quality threshold; and when receiving the second feedback signal sent by the first measurement device, the measurement controller receiving a new AOD sent by the second measurement device, generating a fourth testing instruction corresponding to the new AOD, and sending the fourth testing instruction to the first measurement device to control the first measurement device to receive the millimeter wave signal at the first AOA, wherein the millimeter wave signal is sent by the array antenna of the second measurement device at the new AOD.

14. The measurement method according to claim 12 further comprising:
the measurement controller generating a fifth testing instruction and a sixth testing instruction according to the testing request signal, and sending the fifth testing instruction to the first measurement device, and sending the sixth testing instruction to the second measurement device;
the first measurement device controlling the omnidirectional antenna of the first measurement device to send the millimeter wave testing signal to the second measurement device according to the fifth testing instruction;
the second measurement device controlling the array antenna of the second measurement device to receive the millimeter wave signal sent by the first measurement device according to the sixth testing instruction, determining a second AOA of the beam of the millimeter wave signal according to the quality of the received millimeter wave signal, and sending the second AOA to the measuring controller;
the measurement controller receiving and storing the second AOA sent by the second measurement device, generating the seventh testing instruction, and sending the seventh testing instruction to the first measurement device;
the first measurement device sending the millimeter wave signal by the array antenna at different AODs according to the seventh testing instruction, and sending AODs to the measurement controller;
the measurement controller receiving and storing the AOD of the beam sent by the first measurement device, generating the eighth testing instruction, and sending the eighth testing instruction to the second measurement device;
the second measurement device receiving the millimeter signal at the second AOA of the first measurement device and by the array antenna according to the eighth testing instruction;
the second measurement device determines whether the quality of the millimeter wave signal exceeds the signal quality threshold, and sending the third feedback signal to the measurement controller by the first antenna if the quality of the millimeter wave signal exceeds the signal quality threshold; and
the measurement controller taking the AOD sent by the first measurement device as a second AOD when receiving the third feedback signal, storing the position of the first measurement device, the second AOA, and the second AOD in the list.

15. The measurement method according to claim 14 further comprising:
when the quality of the millimeter wave signal does not exceed the signal quality threshold, the second measurement device sending a fourth feedback signal to the measurement controller by the first antenna;
when receiving the fourth feedback signal sent by the second measurement device, the measurement controller receiving a new AOD sent by the first measurement device, generating an eighth testing instruction corresponding to the new AOD, and sending the eighth testing instruction to the second measurement device to control the second measurement device to receive the millimeter wave signal at the second AOA, wherein the millimeter wave signal is sent by the first measurement device by the array antenna of the first measurement device at the newt AOD.

16. The measurement method according to claim 14, wherein the array antenna has four sectors, each sector of the four sectors has at least one sector antenna.

17. The measurement method according to claim 16 further comprising:
the first measurement device controlling the sector antenna in the four sectors of the array antenna to scan and receive the millimeter wave signal sent by the second measurement device at different AOAs according to the second testing instruction sent by the measurement controller.

18. The measurement method according to claim 16 further comprising:
the first measurement device controlling the sector antenna in the four sectors of the array antenna in the first measurement device to scan and sending the millimeter wave signal to the second measurement device at different AODs according to the seventh testing instruction sent by the measurement controller.

19. The measurement method according to claim 11 further comprising:
the first measurement device determining whether the first measurement device moves to a new position; and
sending a new testing request signal containing the position information of the first measurement device to the measurement controller when the first measurement device moves to a new position.

20. The measurement method according to claim 11, wherein the array antenna has three sectors, each sector of the three sectors has at least one sector antenna.

* * * * *